United States Patent Office 3,655,833
Patented Apr. 11, 1972

3,655,833
REACTION PRODUCTS OF PHENOL DERIVATIVES WITH PHOSPHOROUS COMPOUNDS
Heinz Eggensperger, Bensheim, Volker Franzen, Heidelberg, and Hans Stephan, Bensheim, Bergstrasse, Germany, assignors to Deutsche Advance Produktion G.m.b.H., Lautern, Odenwald, Germany
No Drawing. Filed July 30, 1968, Ser. No. 748,619
Claims priority, application Germany, Aug. 12, 1967, P 16 43 880.5
Int. Cl. C07f 9/08
U.S. Cl. 260—948    8 Claims

ABSTRACT OF THE DISCLOSURE

Novel compounds having the formula:

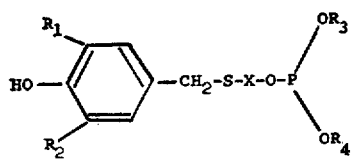

wherein $R_1$ is selected from the group consisting of hydrogen and alkyl radicals having 1 to 6 carbon atoms, $R_2$ is an alkyl radical having 1 to 6 carbon atoms, X is selected from the group consisting of alkylene radicals having 1 to 6 carbon atoms and carboxyl substituted alkyl radicals having 1 to 6 carbon atoms, and $R_3$ and $R_4$ are selected from the group consisting of alkyl, aryl, alkaryl, arylalkyl and

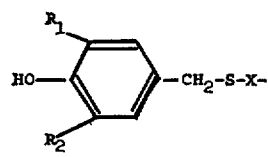

wherein $R_1$, $R_2$ and X are as defined above are useful as stabilizers for polymeric compositions.

---

The decomposition of organic polymer compounds by heat and light usually in the presence of oxygen is known to result in a loss of desirable qualities. This decomposition has been retarded by the addition of stabilizers as for example of phenols, organic phosphites and trithiophosphites.

We have discovered that organic polymer compounds may be stabilized against decomposition by heat, oxygen and/or light obtained by the high temperature reaction product of a suitable phenol derivative with certain phosphorous compounds.

Suitable phenol derivatives are those having the formula:

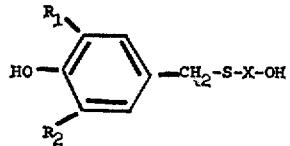

wherein $R_1$ is hydrogen or a straight chain or a branched chain alkyl group with 1 to 6 carbon atoms, $R_2$ is a straight chain or branched chain alkyl group with 1 to 6 carbon atoms and X is an alkylene chain with 1 to 6 carbon atoms which may be interrupted by a carboxyl group.

The phosphorous compound useful practicing the present invention are those having the formula:

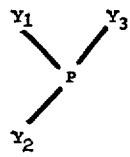

(II)

wherein $Y_1$, $Y_2$ and $Y_3$ are selected from the group consisting of alkoxy, aryloxy, alkaryloxy, arylalkoxy radicals having 1 to 30 carbons and chlorine.

These new reaction products are only slightly volatile, have a superior stabilizing effect compared with known stabilizers and can be used to stabilize a large number of different polymers. Some examples of organic polymers that are stabilized by the new compounds of the present invention are polyolefins, polydiolefins, polystyrene, copolymers of butadiene and styrene (BS polymers), terpolymers of acrylonitrile-butadiene-styrene (ABS polymers), terpolymers of methacrylic acid ester-butadiene-styrene (MBS polymers), as well as polymers and copolymers of vinyl chloride and organic esters, such as vinyl acetate and methyl methacrylate. The novel stabilizers are also useful to stabilize synthetic and natural oils and plasticizers such as dioctyl phthalate and the like.

The phenols used as starting compounds in Formula I can be obtained without difficulty and in good yield from the corresponding hydroxybenzyl halides and mercaptides by the following reaction:

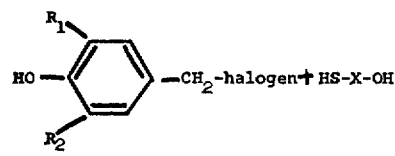

Compound (I) + H halogen

Some examples of the phenol derivatives suitable as starting compounds of Formula I are:

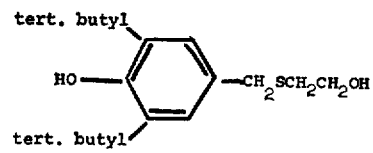

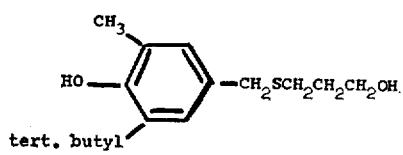

and

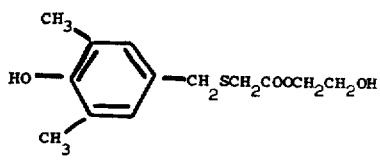

In the reaction of the phenols of Formula I with the phosphorous compounds of Formula II at elevated temperature, the two reaction partners combine to form products having the following formula:

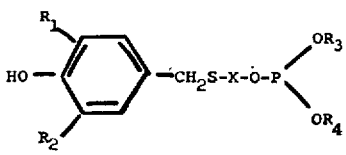

in which R₁, R₂ and X have the meaning given above and R₃ and/or R₄ are alkyl, aryl, arylalkyl, alkaryl or have the formula:

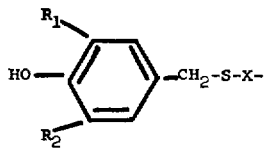

Combinations of Formula III with more than one

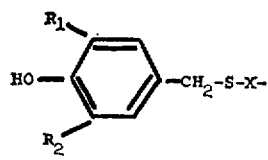

group in the molecule are obtained if the proportion of phenol derivative of Formula I to the phosphorus compound is about 3:1 or about 2:1.

If one of the radicals R₁ or R₂ in the phenol derivative of Formula I represents hydrogen, or, if R₁ and R₂ are methyl groups, some of the phenolic OH groups will react with the phosphorous compound forming a compound having the following formula:

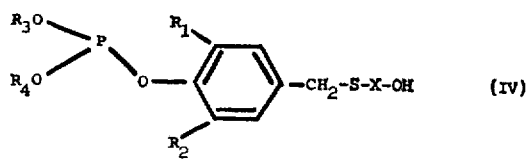

These mixtures likewise produce excellent stabilizers.

The compounds of Formulas III and IV have not yet been described in the literature, however, they are usually very viscous liquids which can be directly used as stabilizers.

The stabilizers of the present invention are generally used in amounts of 0.1 to 10% by weight of the polymer or oil being stabilized and they can be used in combination with known phenolic antioxidants or thioether compounds, for example the esters of thiodipropionic acid.

The simplest way of preparing the new compounds of the present invention is by heating the phenol derivatives of Formula I with the phosphorus compounds of Formula II in the desired mole ratio under a vacuum at temperatures in the range of about 120 to 180° C., whereby compounds containing hydroxyl groups are produced and are continuously removed from the reaction medium. The reaction residue is usually a viscous liquid and is the stabilizer of the invention. The reaction by-products can also be removed by distillation, when necessary or desired.

Some examples for the phosphorous compounds of Formula II are: triphenyl phosphite, didecyl phenyl phosphite, diphenyl octyl phosphite, di(nonylphenyl)phenyl phosphite, diethyl chlorophosphite, butyl dichlorophosphite and phosphorous trichloride.

When the phosphorous compound is PCl₃, the reaction proceeds in an expected manner. After adding 3 moles of an acid binding agent, preferably triethylamine, to a solution of 3 moles of the phenol derivative corresponding to Formula I in an inert organic solvent, preferably petroleum ether, 1 mole phosphorous trichloride is added dropwise with cooling (20–25° C.). After stirring for some time, triethylamine hydrochloride is removed by suction filtration and the product washed with ice water and sodium bicarbonate until neutral. The solvent is distilled off and the residue can be used directly as stabilizer.

Some examples of compounds conforming to Formula III, which can be prepared by above procedures are:

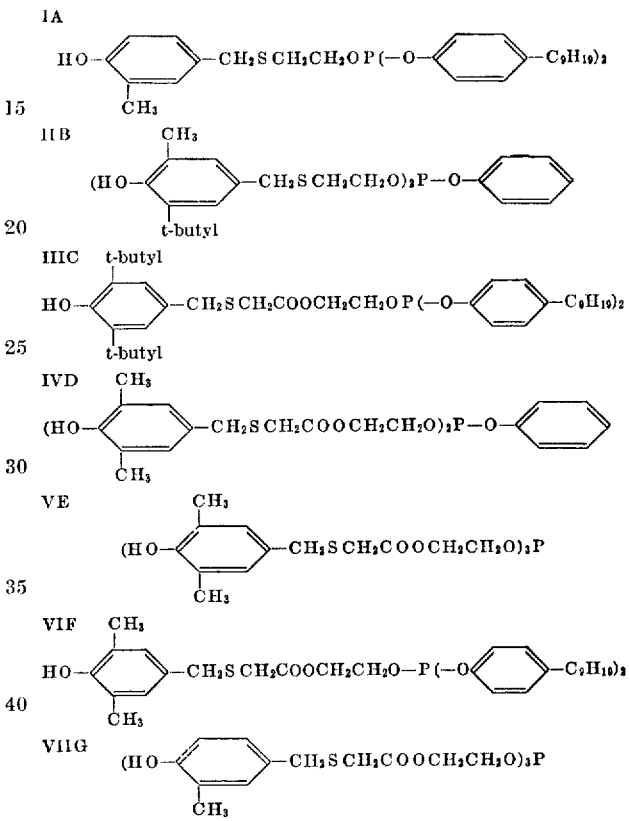

The invention will now be more fully illustrated by the following examples, but it is not limited thereto.

EXAMPLE I

The reaction product of triphenylphosphite and (3,5-dimethyl-4-hydroxybenzyl mercapto)-acetic acid 2-hydroxyethyl ester.

568 g. (2.1 mole) of (3,5-dimethyl-4-hydroxybenzyl mercapto) acetic acid 2-hydroxyethyl ester and 217 g. (0.7 mole) of triphenylphosphite were heated under vacuum to 150° C. and the phenol released is distilled off dry under a pressure of 0.1 to 0.2 torr. The residue is filtered and 573 g. (98% of the theoretical) of a very viscous liquid is obtained suitable for use directly as a stabilizer.

According to the IR spectrum there are, in addition to aliphatic P—O bonds, also 20% aromatic P—O bonds, and free alcohol groups present, thus confirming that the compound of Formula E was obtained.

EXAMPLE II

The reaction product of tris(nonylphenyl)-phosphite and 3,5 di-isopropyl-4-hydroxybenzyl-mercaptoacetic acid-beta-hydroxyethyl ester.

3.3 g. (10 mM.) of the above-identified ester and 6.9 g. (10 mM.) tris-nonylphenylphosphite are heated under a high vacuum to 170–175° C. and the nonylphenol released was distilled off.

The residue, a very viscous liquid ($n_D^{20}$: 1.5327), can be used directly for stabilizing.

EXAMPLE III

Polypropylene can be stabilized as follows:

The stabilizers or stabilizer mixtures indicated in Table I were each mixed with 100 parts polypropylene powder. All mixtures were rolled on a laboratory roller for 10 minutes at 180° C. into foils, which were then compressed on a press at 200 atmopheres and 200° C. to plates having 1 mm. thickness. Each plate was cut into 5 strips and subjected to accelerated aging in a drying cabinet at 140° C. and the time to the inception of brittleness of the samples was determined.

The stabilizing effect of the reaction products used according to the invention was compared with that of trithiophosphite (DAS 1,153,164) and the aromatic phosphites (DAS 1,229,296).

Table I

| Stabilizer (percent based on wt. pts. per 100 wt. pts. polypropylene): | Brittleness after days |
|---|---|
| 0.25% trithiophenylphosphite (DAS, 1,153,164) | 2 |
| 0.25% trithioluaryl phosphite (DAS 1,229,296) | 10 |
| 0.25% reaction product of 1 mole of PCl$_3$ and 3 moles 3-tert.butyl-4-oxyanisol with 4,4-thio-bis-(6-tert-butyl-m-cresol) | 22 |
| 0.25% reaction product of 3 moles (4-hydroxy-2,6 - dimethylbenzyl) - mercaptoacetic acid monoethylene glycol ester with 1 mole triphenyl phosphite | 25 |

EXAMPLE IV

A mixture of 40 parts polyvinyl chloride of K-value 60, 40 parts of an ABS polymer, 20 parts dioctyl phthalate and 2 parts epoxidized soybean oil was stabilized and tested as follows:

Each of the stabilizers in Table II was mixed with 100 parts of the above composition, rolled for 5 minutes at 175° C. to 0.5 mm. thick foils, compressed and after division into several small plates, stored in air in a drying cabinet adjusted to 190° C. After intervals of 60, 75 and 90 minutes the plates were taken out of the heating cabinet and tested for decomposition by observing any discoloration.

TABLE II

| Stabilizer (percent based on wt. pts. per 100 wt. pts. resin) | Color of sample after— | | |
|---|---|---|---|
| | 60 min. | 75 min. | 90 min. |
| 2.0% commercial Ba/Cd stabilizer+ 0.4% didecylphenyl phosphite. | Brown | Dark brown. | Brownish black. |
| 2.0% of the Ba/Cd stabilizer as above +0.2% stabilizer C. | Yellow | Yellow | Light brown. |

EXAMPLE V

MBS resins were stabilized as follows:

All of the mixtures listed in Table III having 100 parts of a terpolymer of a methacrylate, butadiene and styrene and the stabilizer indicated were rolled on a laboratory roller for 10 minutes into foils, which were compresesd on a plate press at 200 atmospheres and 190° C. From all foils of 1 mm. thickness, 5 strips were cut and subjected to accelerated aging in a circulating air drying cabinet at 90° C.

The stabilizing effect was judged by the color change and brittleness of the strips.

TABLE III

| Mixture | Color after 20 days | Brittle after (days) |
|---|---|---|
| 100 parts MBS resin<br>0.25 part 2,6-di-tert. butyl-p-cresol<br>0.25 part trisnonylphenylphosphite | Colorless | 28 |
| 100 parts MBS resin<br>0.5 part 4,4'-thio-bis-(6-tert. butyl-m-cresol) | Brown | 37 |
| 100 parts MBS resin<br>0.5 part stabilizer F | Colorless | 63 |

EXAMPLE VI

Dioctylphthalate was stabilized as follows:

Mixtures of 3 g. were prepared from dioctylphthalate and the stabilizers indicated in Table IV, which were then heated to 192° C. in a closed vessel with oxygen. The time was observed for the pressure to drop to 20 torr caused by the plasticizer absorbing oxygen. The oxygen absorption is a sign of incipient decomposition.

Table IV

| Stabilized (percent based on wt. pts. per 100 wt. pts. resin | Time for pressure drop of 20 torr in hrs. |
|---|---|
| 0.5% 2,2 - bis-(4-hydroxyphenyl)propane(bis-phenol A) | 5.75 |
| 0.2% stabilizer No. A | 7.25 |
| 0.2% stabilizer F | 8.50 |

EXAMPLE VII

A synthetic polymer oil was stabilized as follows:

Mixtures of 3 g. were prepared from an oil of a copolymer of ethylene and polyisobutylene and the stabilizers indicated in Table V. The oxygen adsorption at 176° C. determined as described under Example VI and is reported in Table V.

Table V

| Stabilizer (percent based on wt. pts. per 100 wt. pts. oil: | Pressure drop to 20 torr after hrs. |
|---|---|
| 0.1% 4,4-thio-bis-(6-tert.butyl-m-cresol)<br>0.1% tris-nonylphenylphosphite | 1.9 |
| 0.2% di-tert.butyl-p-cresol | 2.2 |
| 0.2% stabilizer D | 2.8 |

We claim:

1. A compound having the formula:

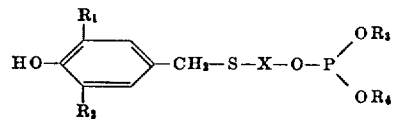

wherein R$_1$ is selected from the group consisting of hydrogen and alkyl radicals having 1 to 6 carbon atoms, R$_2$ is an alkyl radical having 1 to 6 carbon atoms, X is selected from the group consisting of alkylene radicals having 1 to 6 carbon atoms and carboxyl interrupted alkylene radicals having 1 to 6 carbon atoms, when R$_1$ or R$_2$ is other than tert. butyl, R$_3$ and R$_4$ are selected from the group consisting of phenyl, nonylphenyl, arnd

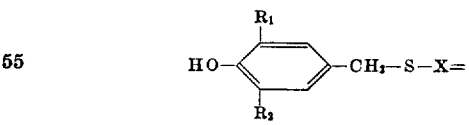

and, when R$_1$ and R$_2$ are tert. butyl, R$_3$ is selected from the group consisting of phenyl, nonylphenyl, and

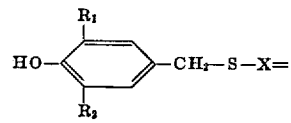

and R$_4$ is selected from group consisting of phenyl and nonylphenyl wherein R$_1$, R$_2$ and X are as defined above.

2. The compound of claim 1 wherein the formula is:

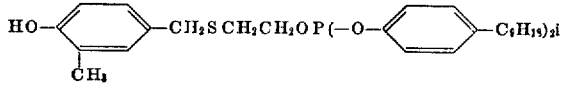

3. The composition of claim 1 wherein the formula is:

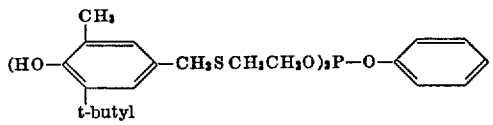

4. The composition of claim 1 wherein the formula is:

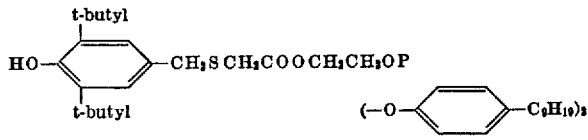

5. The composition of claim 1 wherein the formula is:

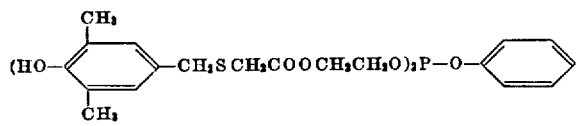

6. The composition of claim 1 wherein the formula is

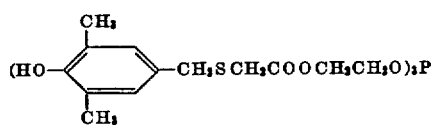

7. The composition of claim 1 wherein the formula is:

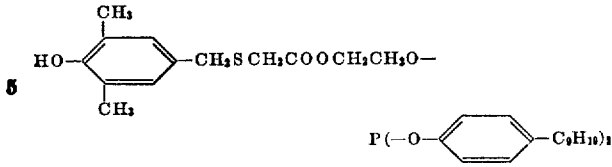

8. The composition of claim 1 wherein the formula is:

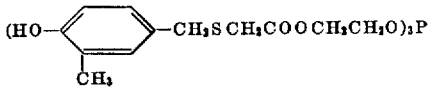

References Cited
UNITED STATES PATENTS

| | | | |
|---|---|---|---|
| 3,351,680 | 11/1967 | Gutman et al. | 260—948 |
| 3,408,324 | 10/1968 | Braus et al. | 260—948 X |
| 3,476,835 | 11/1969 | Schwachhofer et al. | 260—982 |
| 3,523,146 | 8/1970 | Braus et al. | 260—948 |
| 3,539,528 | 8/1970 | Braus et al. | 260—44.85 |

JOSEPH REBOLD, Primary Examiner

R. L. RAYMOND, Assistant Examiner

U.S. Cl. X.R.

260—45.85, 45.95, 973, 976, 982